(12) United States Patent
Wu et al.

(10) Patent No.: US 12,463,288 B2
(45) Date of Patent: Nov. 4, 2025

(54) BATTERY, ELECTRIC APPARATUS, AND METHOD AND APPARATUS FOR MANUFACTURING BATTERY

(71) Applicant: JIANGSU CONTEMPORARY AMPEREX TECHNOLOGY LIMITED, Changzhou (CN)

(72) Inventors: Kai Wu, Changzhou (CN); Xiaoteng Huang, Changzhou (CN); Wenli Wang, Changzhou (CN); Jiarong Hong, Changzhou (CN); Haiqi Yang, Changzhou (CN); Langchao Hu, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 756 days.

(21) Appl. No.: 17/842,555

(22) Filed: Jun. 16, 2022

(65) Prior Publication Data

US 2022/0311086 A1   Sep. 29, 2022

Related U.S. Application Data

(63) Continuation of application No. PCT/CN2020/122001, filed on Oct. 19, 2020.

(51) Int. Cl.
*H01M 50/342* (2021.01)
*H01M 50/209* (2021.01)
(Continued)

(52) U.S. Cl.
CPC ..... *H01M 50/3425* (2021.01); *H01M 50/209* (2021.01); *H01M 50/375* (2021.01);
(Continued)

(58) Field of Classification Search
CPC ........... H01M 50/3425; H01M 50/209; H01M 50/375; H01M 50/383; H01M 50/514;
(Continued)

(56) References Cited

U.S. PATENT DOCUMENTS

2003/0003350 A1   1/2003 Heimer et al.
2006/0073375 A1   4/2006 Hong et al.
(Continued)

FOREIGN PATENT DOCUMENTS

CN      1306679 A     8/2001
CN      205508970 U   8/2016
(Continued)

OTHER PUBLICATIONS

English translation of CN 210535738 U-Heat insulation assembly of battery module; Shanghai Nio Automobile Co LTD; May 15, 2020 (Year: 2020).*

(Continued)

*Primary Examiner* — Adam J Francis
(74) *Attorney, Agent, or Firm* — ANOVA LAW GROUP, PLLC

(57) ABSTRACT

This application relates to a battery, an electric apparatus, and a method and an apparatus for manufacturing a battery. The battery includes a plurality of battery cells and an insulation part. The plurality of battery cells are electrically connected by a busbar; and the battery cell includes a pressure relief mechanism, and the pressure relief mechanism is configured to be actuated when internal pressure or temperature of the battery cell reaches a threshold, to release the internal pressure. The insulation part is configured to cover the busbar, to prevent emissions from the battery cell from causing short circuit of at least one battery cell when the pressure relief mechanism is actuated.

18 Claims, 8 Drawing Sheets

(51) Int. Cl.
*H01M 50/375* (2021.01)
*H01M 50/383* (2021.01)
*H01M 50/514* (2021.01)
*H01M 50/588* (2021.01)
*H01M 50/59* (2021.01)

(52) U.S. Cl.
CPC ....... *H01M 50/383* (2021.01); *H01M 50/514* (2021.01); *H01M 50/588* (2021.01); *H01M 50/59* (2021.01); *H01M 2200/10* (2013.01); *H01M 2200/20* (2013.01)

(58) Field of Classification Search
CPC .. H01M 50/588; H01M 50/59; H01M 50/507; H01M 50/342; H01M 50/204; H01M 50/593; H01M 2200/10; H01M 2200/20
See application file for complete search history.

(56) References Cited

U.S. PATENT DOCUMENTS

| | | | |
|---|---|---|---|
| 2006/0255764 | A1 | 11/2006 | Cho |
| 2010/0136391 | A1 | 6/2010 | Prilutsky et al. |
| 2011/0177382 | A1 | 7/2011 | Kim |
| 2012/0114993 | A1 | 5/2012 | Park et al. |
| 2012/0308877 | A1 | 12/2012 | Hirai |
| 2014/0170447 | A1 | 6/2014 | Woehrle et al. |
| 2014/0242424 | A1 | 8/2014 | Jones |
| 2015/0144409 | A1* | 5/2015 | Fujii .................. H01M 50/519 429/121 |
| 2015/0287963 | A1 | 10/2015 | Chiba |
| 2017/0256764 | A1 | 9/2017 | Li |
| 2018/0138478 | A1* | 5/2018 | Chan .................. H01M 50/271 |
| 2019/0334146 | A1 | 10/2019 | Lai et al. |
| 2019/0348649 | A1 | 11/2019 | Ryu et al. |
| 2020/0058967 | A1 | 2/2020 | Berge et al. |
| 2020/0212524 | A1 | 7/2020 | Wang et al. |
| 2020/0212526 | A1 | 7/2020 | Wu et al. |
| 2021/0016668 | A1 | 1/2021 | Nakahara et al. |
| 2021/0075075 | A1 | 3/2021 | Kim et al. |
| 2021/0113871 | A1 | 4/2021 | Huang et al. |
| 2022/0118861 | A1 | 4/2022 | Zeng et al. |
| 2022/0123430 | A1 | 4/2022 | Liang et al. |
| 2022/0311086 | A1 | 9/2022 | Wu et al. |
| 2023/0223650 | A1 | 7/2023 | Zhao et al. |

FOREIGN PATENT DOCUMENTS

| | | | | |
|---|---|---|---|---|
| CN | 205542977 | U | 8/2016 | |
| CN | 205583008 | U | 9/2016 | |
| CN | 106356579 | A | 1/2017 | |
| CN | 106450575 | A | 2/2017 | |
| CN | 106785182 | A | 5/2017 | |
| CN | 206834290 | U | 1/2018 | |
| CN | 107910606 | A | 4/2018 | |
| CN | 107994175 | A | 5/2018 | |
| CN | 108075086 | A | 5/2018 | |
| CN | 207441811 | U | 6/2018 | |
| CN | 207474504 | U | 6/2018 | |
| CN | 207474524 | U | 6/2018 | |
| CN | 207886552 | U | 9/2018 | |
| CN | 207909930 | U | 9/2018 | |
| CN | 207967074 | U | 10/2018 | |
| CN | 207977389 | U | 10/2018 | |
| CN | 108922998 | A | 11/2018 | |
| CN | 109244349 | A | 1/2019 | |
| CN | 208478517 | U | 2/2019 | |
| CN | 208955153 | U | 6/2019 | |
| CN | 209071461 | U | 7/2019 | |
| CN | 209104233 | U | 7/2019 | |
| CN | 110148694 | A | 8/2019 | |
| CN | 209249563 | U | 8/2019 | |
| CN | 110212265 | A | 9/2019 | |
| CN | 209344171 | U | 9/2019 | |
| CN | 209401662 | U | 9/2019 | |
| CN | 209490404 | U | 10/2019 | |
| CN | 110459719 | A | 11/2019 | |
| CN | 209592146 | U | 11/2019 | |
| CN | 209662489 | U | 11/2019 | |
| CN | 209804782 | U | 12/2019 | |
| CN | 110868645 | A | 3/2020 | |
| CN | 110875443 | A | 3/2020 | |
| CN | 210403875 | U | 4/2020 | |
| CN | 111106276 | A | 5/2020 | |
| CN | 210535738 | U | * 5/2020 | |
| CN | 210668459 | U | 6/2020 | |
| CN | 210723159 | U | * 6/2020 | |
| CN | 211088371 | U | 7/2020 | |
| CN | 111509163 | A | 8/2020 | |
| CN | 111509326 | A | 8/2020 | |
| CN | 111584792 | A | 8/2020 | |
| CN | 111725454 | A | 9/2020 | |
| CN | 111742440 | A | 10/2020 | |
| CN | 211700415 | U | 10/2020 | |
| DE | 102011075318 | A1 | 11/2012 | |
| DE | 102011109249 | A1 | 2/2013 | |
| EP | 3333932 | A1 | 6/2018 | |
| EP | 3940860 | A1 | 1/2022 | |
| IN | 106960977 | A | 7/2017 | |
| JP | H04349342 | A | 12/1992 | |
| JP | H6349521 | A | 12/1994 | |
| JP | 2008251263 | A | 10/2008 | |
| JP | 2009170258 | A | 7/2009 | |
| JP | 2010153141 | A | 7/2010 | |
| JP | 2012018766 | A | 1/2012 | |
| JP | 2012094313 | A | 5/2012 | |
| JP | 5137480 | B2 | 2/2013 | |
| JP | 2014049427 | A | 3/2014 | |
| JP | 2014103051 | A | 6/2014 | |
| JP | 2014110138 | A | 6/2014 | |
| JP | 2015046354 | A | 3/2015 | |
| JP | 2017139099 | A | 8/2017 | |
| JP | 2017147128 | A | 8/2017 | |
| JP | 2017152213 | A | 8/2017 | |
| JP | 2018018753 | A | 2/2018 | |
| JP | 2018045891 | A | 3/2018 | |
| JP | 2018116813 | A | 7/2018 | |
| JP | 2019029245 | A | 2/2019 | |
| JP | 2019149291 | A | 9/2019 | |
| KR | 20120040647 | A | 4/2012 | |
| KR | 20130061375 | A | 6/2013 | |
| KR | 20170095971 | A | 8/2017 | |
| KR | 20190001408 | A | 1/2019 | |
| WO | 2005114811 | A2 | 12/2005 | |
| WO | WO-2013017204 | A1 | * 2/2013 | .......... H01M 2/1077 |
| WO | 2020204901 | A1 | 10/2020 | |

OTHER PUBLICATIONS

English translation of CN 210723159 U- Fire extinguishing power battery module and battery pack; Suzhou Yuliang Battery Co LTD ; Jun. 9, 2020 (Year: 2020).*
The China National Intellectual Property Administration (CNIPA) First Office Action for CN Application No. 202011121539.4 Dec. 7, 2020 16 Pages (Including English translation).
The United States Patent and Trademark Office (USPTO) Office Action for U.S. Appl. No. 18/295,151 Aug. 16, 2023 24 Pages.
The China National Intellectual Property Administration (CNIPA) First Office Action for CN Application No. 202011121540.7 Dec. 7, 2020 13 Pages (Including English translation).
The China National Intellectual Property Administration (CNIPA) First Office Action for CN Application No. 202110210133.1 Jan. 11, 2022 14 Pages (Including English translation).
The European Patent Office (EPO) The Extended Search Report for EP Application No. 20957979.6 Jul. 24, 2023 9 Pages.
Japan Patent Office (JPO) The Notice of Reasons for Refusal For JP Application No. 2022-544802 Sep. 4, 2023 8 Pages (Translation Included).
The China National Intellectual Property Administration (CNIPA) First Office Action for CN Application No. 202011121541.1 Jun. 14, 2022 24 Pages (Including English translation).

(56) References Cited

OTHER PUBLICATIONS

The European Patent Office (EPO) The Extended Search Report for EP Application No. 20827955.4 Apr. 7, 2022 8 Pages.
The China National Intellectual Property Administration (CNIPA) First Office Action for CN Application No. 202011120261.9 Dec. 8, 2020 31 Pages (Including English translation).
The European Patent Office (EPO) The Extended Search Report for EP Application No. 20827972.9 Feb. 10, 2022 5 Pages.
The European Patent Office (EPO) Communication under Rule 71(3) for EP Application No. 20827972.9 Jul. 28, 2022 58 Pages.
The United States Patent and Trademark Office (USPTO) Office Action for U.S. Appl. No. 17/138,818, filed Feb. 13, 2023 31 Pages.
The World Intellectual Property Organization (WIPO) International Search Report and Written Opinion for PCT/CN2020/122000 Jul. 20, 2021 14 pages (Including English translation).
The World Intellectual Property Organization (WIPO) International Search Report and Written Opinion for PCT/CN2020/121999 Jul. 20, 2021 14 pages (Including English translation).
The World Intellectual Property Organization (WIPO) International Search Report and Written Opinion for PCT/CN2020/121992 Jul. 21, 2021 15 pages (Including English translation).
The World Intellectual Property Organization (WIPO) International Search Report and Written Opinion for PCT/CN2020/121990 Jul. 20, 2021 13 pages (Including English translation).
The European Patent Office (EPO) Extended Search Report for EP Application No. 20957981.2 Mar. 30, 2023 10 Pages.
The World Intellectual Property Organization (WIPO) International Search Report and Written Opinion for PCT/CN2020/122001 Jul. 22, 2021 17 pages (With Translation).
The China National Intellectual Property Administration (CNIPA) The First Office Action for Chinese Application 202011120255.3 Nov. 23, 2020 15 Pages (With Translation).
Korean Intellectual Property Office (KIPO) Notice of Allowance for Application No. 10-2023-7002165 Sep. 26, 2024 5 Pages (including translation).
The Japan Patent Office (JPO) Decision to Grant a Patent for Application No. 2023-509570 Oct. 7, 2024 8 Pages (including translation).
United States Patent and Trademark Office (USPTO) Advisory Action for U.S. Appl. No. 18/175,248, filed Oct. 7, 2024 7 Pages.
United States Patent and Trademark Office (USPTO) Final Rejection for U.S. Appl. No. 18/175,248, filed Jul. 26, 2024 37 Pages.
The European Patent Office (EPO) The Extended European Search Report for U.S. Appl. No. 20/957,980.4 Dec. 11, 2023 9 Pages.
Korean Intellectual Property Office (KIPO) Office Action 1 for Application No. 10-2023-7001610 Feb. 7, 2024 5 Pages (including translation).
United States Patent and Trademark Office (USPTO) Notice of Allowance for U.S. Appl. No. 17/138,818, filed Sep. 6, 2023 8 Pages.
The Japan Patent Office (JPO) Notification of Reasons for Refusal for Application No. 2023-506304 Feb. 26, 2024 11 Pages (including translation).
The Japan Patent Office (JPO) Notification of Reasons for Refusal for Application No. 2023-509570 and Translation Mar. 18, 2024 14 Pages.
The Japan Patent Office (JPO) Decision to Grant a Patent for Application No. 2023-509570 and Translation Mar. 4, 2024 7 Pages.
United States Patent and Trademark Office (USPTO) Notice of allowance and fees due, examiner interview summary record, for U.S. Appl. No. 17/138,761, filed May 1, 2024 53 Pages.
United States Patent and Trademark Office (USPTO) Non-final rejection, for U.S. Appl. No. 18/175,248, filed Mar. 13, 2024 44 Pages.
The Korean Intellectual Property Office Notice of Allowance for Application No. 10-2022-7033637 Apr. 19, 2025 5 Pages (including translation).

* cited by examiner

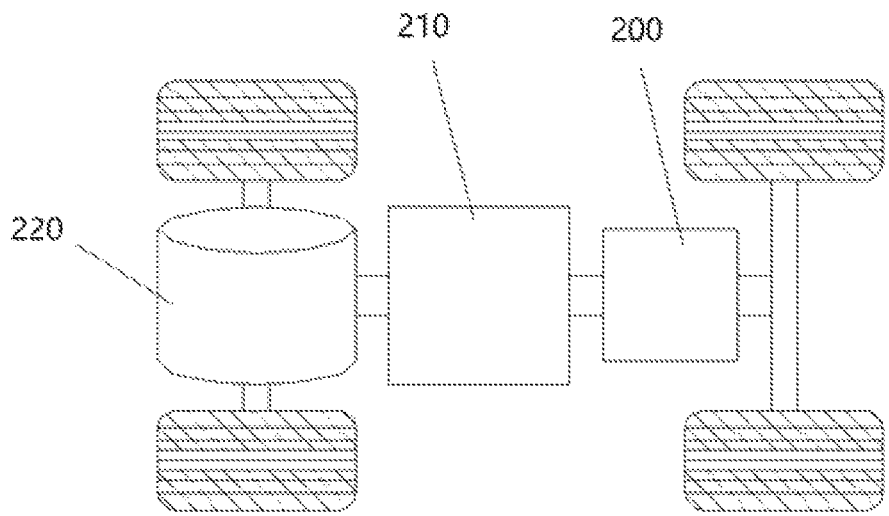
FIG. 1-A
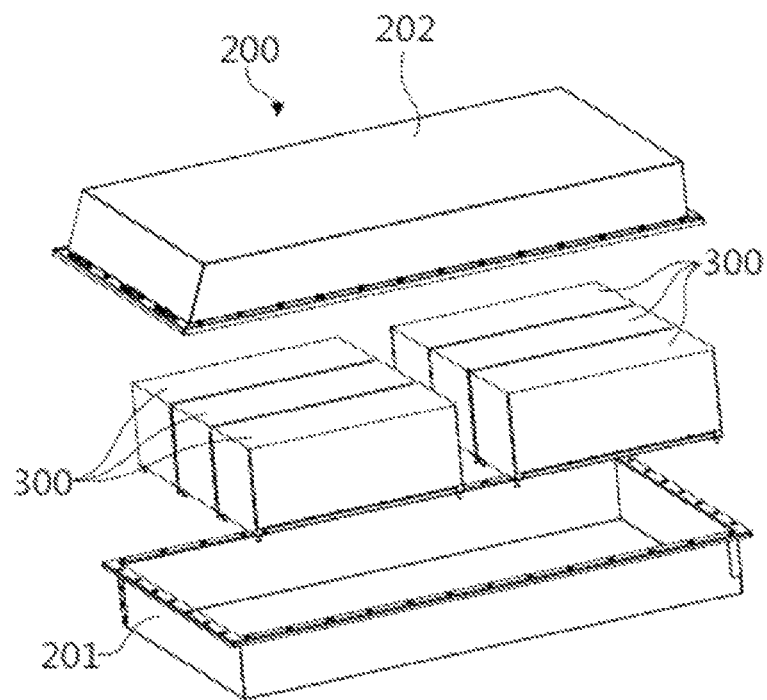
FIG. 1-B

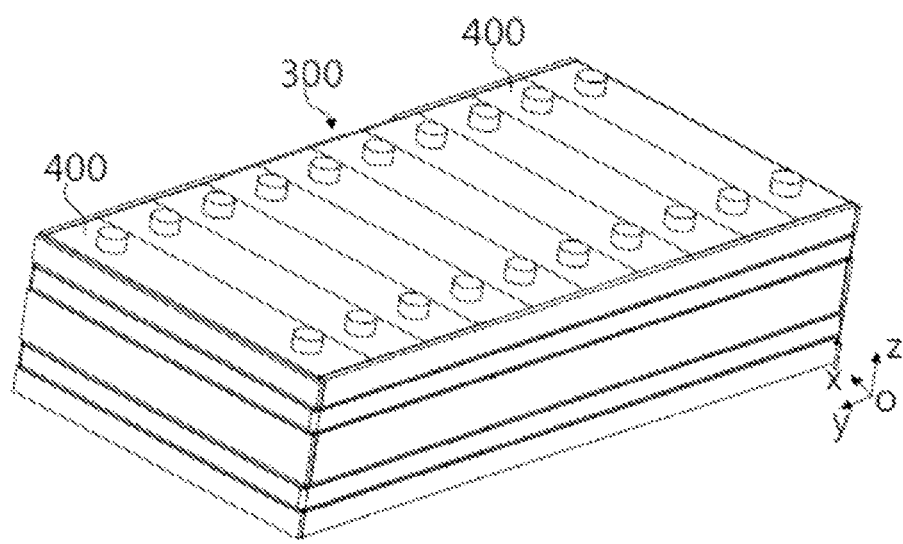
FIG. 1-C

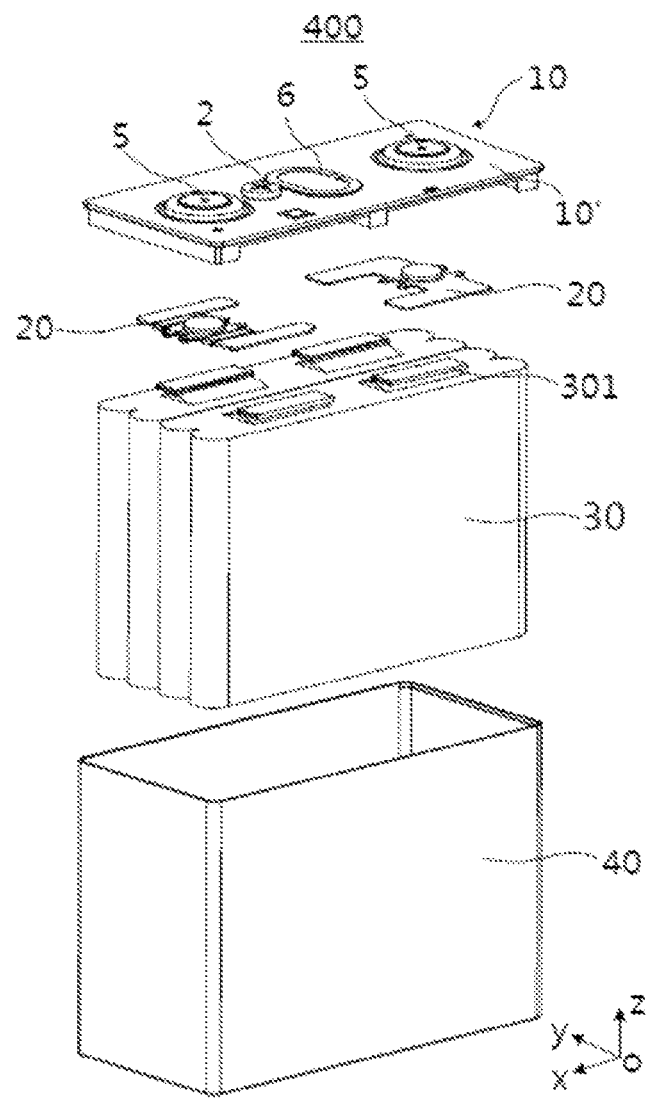
FIG. 1-D

# BATTERY, ELECTRIC APPARATUS, AND METHOD AND APPARATUS FOR MANUFACTURING BATTERY

CROSS-REFERENCE TO RELATED APPLICATIONS

This application is a continuation application of International Patent Application No. PCT/CN2020/122001, filed with China National Intellectual Property Administration on Oct. 19, 2020, which is incorporated herein by reference in its entirety.

TECHNICAL FIELD

This application relates to the field of battery technologies, and in particular, to a battery, an electric apparatus, and a method and an apparatus for manufacturing a battery.

BACKGROUND

In recent years, new energy vehicles have significantly promoted social development and environmental protection. Batteries as an important new power source are widely used in the field of new energy vehicles.

Currently, spontaneous combustion of batteries caused by thermal runway during use is a principal factor for safety accidents of new energy vehicles. When thermal runaway occurs in one battery cell in the battery, high temperature emissions are ejected out of the battery cell. The high temperature emissions splash to surrounding battery cells, causing severe safety accidents.

SUMMARY

This application provides a battery, an electric apparatus, and a method and an apparatus for manufacturing a battery, which can reduce safety accidents caused by thermal runaway of the battery.

A first aspect of this application provides a battery, including:
- a plurality of battery cells, where the plurality of battery cells are constructed to be electrically connected by using a busbar; and
- the battery cell includes a pressure relief mechanism, and the pressure relief mechanism is configured to be actuated when internal pressure or temperature of the battery cell reaches a threshold, to release the internal pressure; and
- an insulation part, configured to cover the busbar to prevent emissions from the battery cell from causing short circuit of at least one battery cell when the pressure relief mechanism is actuated.

In some embodiments, the insulation part and the busbar are both provided in plurality, and each insulation part covers at least one busbar.

In some embodiments, the plurality of battery cells are stacked to form a battery module; and the insulation part is configured to cover the busbar located on the adjacent battery modules.

In some embodiments, a thickness of the insulation part is 0.5 mm to 3 mm.

In some embodiments, the battery further includes a fire protection pipeline, configured to accommodate a fire protection medium, where the fire protection pipeline is configured to discharge the fire protection medium to the battery cell when the pressure relief mechanism is actuated, and the insulation part is configured to prevent the fire protection medium from causing short circuit of at least one battery cell when the pressure relief mechanism is actuated.

In some embodiments, the fire protection pipeline includes a first region corresponding to the pressure relief mechanism and a second region located on a periphery of the first region, where the first region is configured to be broken when the pressure relief mechanism is actuated, to discharge the fire protection medium, and the second region is configured to remain intact when the pressure relief mechanism is actuated, to allow the fire protection medium to flow from the second region to the first region.

In some embodiments, the battery further includes a protection part, disposed between the fire protection pipeline and the battery cell to protect the second region.

In some embodiments, the protection part includes a third region and a fourth region, where the third region is configured to protect the second region of the fire protection pipeline when the pressure relief mechanism is actuated, and the fourth region is configured to allow, when the pressure relief mechanism is actuated, the emissions from the battery cells to pass through the fourth region to break the first region.

In some embodiments, the protection part is configured to form a first groove for accommodating the fire protection pipeline, where the first groove is configured to collect, when the pressure relief mechanism is actuated, the fire protection medium flowing into the battery cell.

In some embodiments, the fourth region is provided on a region that is on a bottom wall of the first groove and that corresponds to the first region.

In some embodiments, the battery further includes an isolation part, where the isolation part is configured to mount the busbar.

In some embodiments, the isolation part has an avoidance region, where the avoidance region is configured to expose at least part of the busbar, to allow the busbar to be electrically connected to the battery cell.

In some embodiments, a second groove is provided on the isolation part, and the protection part is disposed in the second groove.

According to a second aspect of this application, an electric apparatus is provided, where the electric apparatus is configured to receive power supplied by the foregoing battery.

According to a third aspect of this application, a method for manufacturing a battery is provided, including:
- providing a plurality of battery cells, where the battery cell includes a pressure relief mechanism, and the pressure relief mechanism is configured to be actuated when internal pressure or temperature of the battery cell reaches a threshold, to release the internal pressure;
- electrically connecting the plurality of battery cells by using a busbar; and
- covering the busbar with an insulation part, to prevent emissions from the battery cell from causing short circuit of at least one battery cell when the pressure relief mechanism is actuated.

According to a fourth aspect of this application, an apparatus for manufacturing a battery is provided, including:
- a first apparatus, configured to provide a plurality of battery cells, where the battery cell includes a pressure relief mechanism, and the pressure relief mechanism is configured to be actuated when internal pressure or temperature of the battery cell reaches a threshold, to release the internal pressure;

a second apparatus, configured to electrically connect the plurality of battery cells by using a busbar; and a third apparatus, configured to cover the busbar with an insulation part, to prevent emissions from the battery cell from causing short circuit of at least one battery cell when the pressure relief mechanism is actuated.

According to the battery provided in the embodiments of this application, with the insulation part configured to cover the busbar, emissions discharged out of the pressure relief mechanism of the battery cell in the case of thermal runaway of the battery can be prevented from splashing to the busbar or other conductive objects, so that a probability of short circuit or high voltage spark in the battery cell can be reduced, improving battery safety during use.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

The drawings described herein are intended for a further understanding of this application and constitute a part of this application. Example embodiments of this application and descriptions thereof are intended to explain this application, and do not constitute any inappropriate limitation on this application.

FIG. 1-A is a schematic structural diagram of an electric apparatus according to an embodiment of this application.

FIG. 1-B is a schematic structural diagram of a battery according to an embodiment of this application.

FIG. 1-C is a schematic structural diagram of a battery module according to an embodiment of this application.

FIG. 1-D is a schematic structural diagram of a battery cell according to an embodiment of this application.

DESCRIPTION OF EMBODIMENTS

Figure 2:
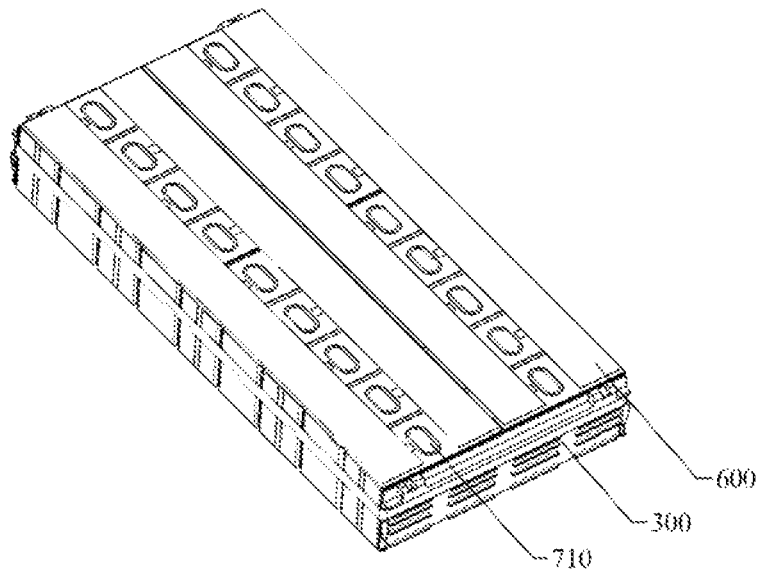
FIG. 2 is a schematic diagram of a structure inside a battery housing according to an embodiment of this application.

To make the objectives, technical solutions, and advantages of this application more comprehensible, the following describes this application in detail with reference to embodiments and accompanying drawings. It should be understood that the specific embodiments described herein are merely used to explain this application but are not intended to limit this application. Any equivalent change made based on the structure, shape, and principle of this application should fall within the protection range of this application.

Unless otherwise defined, all technical and scientific terms used herein have the same meanings as those usually understood by a person skilled in the art of this application. The terms used in the specification of this application are for description of the particular embodiments only and are not intended to limit this application. The terms "including" and "having" and any other variations thereof in the specification, claims, and brief description of drawings of this application are intended to cover a non-exclusive inclusion.

The term "embodiment" described herein means that specific features, structures or characteristics described with reference to the embodiments may be incorporated in at least one embodiment of this application. The word "embodiment" in various positions in the specification does not necessarily refer to the same embodiment, or refer to independent or alternative embodiments that are mutually exclusive with other embodiments. A person skilled in the art explicitly or implicitly understands that the embodiments described herein may combine with other embodiments.

The term "and/or" in this specification is only an associative relationship for describing associated objects, indicating that three relationships may exist. For example, A and/or B may represent the following three cases: Only A exists, both A and B exist, and only B exists. In addition, the symbol "/" in this specification generally represents an "or" relationship between associated objects.

In addition, the terms "first", "second", and the like in the specification and the claims or foregoing accompanying drawings of this application are used to distinguish between different objects but not describe a specific sequence, and may explicitly or implicitly include one or more features.

In the descriptions of this application, unless otherwise specified, "a plurality of" indicates more than two (including two). Likewise, "multiple groups" indicates more than two groups (including two groups).

In the descriptions of this application, it should be noted that, unless otherwise specified and defined explicitly, the terms "mount", "connected" and "connect" should be understood in a broad sense. For example, "connected" or "connect" of a mechanical structure may indicate physically connect. For example, physically connect may be fixedly connect, for example, fixedly connect by using a fixing member such as a screw, a bolt or other fixing members; or physically connect may be detachably connect, for example, connect by mutual clamping or clamping; or physically connect may be integrally connect, for example, connect by welding, bonding or integral molding. "Connected" or "connect" of a circuit structure may indicate physically connect, or may indicate electrically connect or signal connect, for example, may be directly connect, namely physically connect, may be indirectly connect by using at least one element in between as long as circuit communication is implemented, or may be communicate between two elements; and signal connect may be signal connect by using a circuit, or may be signal connect by using a media medium, such as a radio wave. A person of ordinary skill in the art can understand specific meanings of these terms in this application based on specific situations.

To clearly describe all directions in the following embodiments, some directional words may be used. For example, directions of a battery are defined by a coordinate system in FIG. 1-D, where an x direction represents a length direction of a battery cell 400, a y direction is perpendicular to the x direction in the horizontal plane and represents a width direction of the battery cell 400, and a z direction is perpendicular to the x direction and the y direction and represents a height direction of the battery. In addition, expressions such as the x direction, the y direction, and the z direction that are used to describe indication directions of operations and constructions of various members of the battery in this embodiment are relative rather than absolute. Although these indications are appropriate when the members of the battery are located at the positions shown in the drawings, these directions shall be interpreted differently when the positions change, to reflect the changes.

Based on same understanding of directions, in the descriptions of this application, the directions or location relationships indicated by the terms such as "center", "longitudinal", "lateral", "length", "width", "thickness", "up", "down", "front", "rear", "left", "right", "vertical", "horizontal", "top", "bottom", "inside", "outside", "clockwise", "counterclockwise", "axial", "radial", "circumferential" are based on the directions or location relationships shown in the accompanying drawings and are merely intended to describe this application and simplify the descriptions, but not intended to indicate or imply that an apparatus or an element shall have a specific direction or be formed and operated in a specific direction, and therefore cannot be understood as a limitation on this application.

Rechargeable batteries may be referred to as secondary batteries or traction batteries. Currently, the widely used rechargeable batteries include but are not limited to: lithium batteries, for example, lithium-sulfur batteries, sodium-lithium-ion batteries, or magnesium-ion batteries. For ease of description, rechargeable batteries herein may be collectively referred to as battery.

Battery safety is a critical characteristic to evaluate a battery. Safety of the battery needs to be guaranteed as much as possible in use or during charging.

The battery is generally formed by connecting a plurality of battery cells. When situations such as external short circuit, over-charging, needle piercing, and plate impact occur in the battery cell, the battery cell is prone to thermal runaway. When thermal runway occurs in the battery cell, emissions are generated inside the battery cell, including substances such as high temperature smoke (or even open flames) and volatile high-temperature electrolyte. These emissions cause thermal diffusion when being discharged, thereby causing thermal runaway to other battery cells and even causing explosion and other accidents. It may be understood that the emissions from the battery cell mentioned in this application include but are not limited to: electrolyte, fragments of positive and negative electrode plates and separator because of dissolution or breaking, high-temperature and high-pressure gas and flames generated by reactions, and the like.

The inventors have found that thermal runaway of a battery cell, may cause short circuit, high voltage spark, or the like to surrounding battery cells.

To resolve this problem, the inventors have found through research that the problems such as short circuit and high voltage spark in the case of thermal runaway of the battery cell are caused by emissions discharged out of the battery coming into contact with the busbar.

In view of this, this application provides a battery, to prevent high temperature emissions ejected out of a battery cell from splashing to a busbar in the case of thermal runaway of the battery cell, reducing short circuit, high voltage spark, and other problems of the battery cell. Therefore, the battery of this application can not only control thermal runaway conditions of the battery cell in a timely manner, to prevent the battery cell from further generating heat and high temperature emissions, but also prevent the high temperature emissions from splashing to the busbar, to reduce short circuit and high voltage spark of the battery cell.

The battery in the embodiments of this application may be applied to various electric apparatuses capable of using electric energy as a power source. The electric apparatus herein may be, but is not limited to, an electric vehicle, an electric train, an electric bicycle, a golf vehicle, an unmanned aerial vehicle, a ship, or the like. In addition, the electric apparatus may be an apparatus powered by the battery only, or may be a hybrid power type apparatus. The battery supplies electric energy to the electric apparatus, and a motor drives the electric apparatus to move.

For example, FIG. 1-A is a schematic structural diagram of an electric apparatus according to an embodiment of this application. The electric apparatus may be a vehicle. The vehicle may be an oil-fueled vehicle, a gas vehicle, or a new energy vehicle. The new energy vehicle may be a battery electric vehicle, a hybrid electric vehicle, an extended-range electric vehicle, or the like. The vehicle includes a battery 200, a controller 210, and a motor 220. The battery 200 is configured to supply power to the controller 210 and the motor 220 as an operational power supply and a driving power supply of the vehicle. For example, the battery 200 is configured to supply power to meet start, navigation, and operation requirements of the vehicle. For example, the battery 200 supplies power to the controller 210. The controller 210 controls the battery 200 to supply power to the motor 220. The motor 220 receives and uses the power of the battery 200 as the driving power supply of the vehicle, to replace or partially replace fuel oil or natural gas to supply driving power to the vehicle.

To make the battery function better to meet use requirements, the battery 200 may include a plurality of battery modules 300 that are connected to each other. As shown in FIG. 1-B, the battery 200 includes a first housing 201, a second housing 202, and a plurality of battery modules 300, where the first housing 201 and the second housing 202 are snap-fitted together, and the plurality of battery modules 300 are arranged in a space enclosed by the first housing 201 and the second housing 202.

As shown in FIG. 1-C, the battery module 300 includes a plurality of battery cells 400. The plurality of battery cells 400 may be connected in series, in parallel or in hybrid connection mode to generate a relatively large current or voltage, where hybrid connection is a combination of series connection and parallel connection. Still referring to FIG. 1-C, the battery cell 400 may be placed upright: a height direction of the battery cell 400 is a z direction, a length direction of the battery cell 400 is an x direction, and the plurality of battery cells 400 are arranged side by side along a width direction thereof in a y direction. Alternatively, the battery cell 400 may be laid flat: a width direction of the battery cell 400 is the z direction, a length direction of the battery cell 400 is the x direction, and the plurality of battery cells 400 may be stacked by at least one layer in the z direction, where each layer includes a plurality of battery cells 400 that are arranged at intervals in the x direction.

To make a person skilled in the art clearly understand improvements of this application, an entire structure of the battery cell 400 is described first.

As shown in FIG. 1-D, the battery cell 400 includes a housing 40, an electrode assembly 30, and an end cover assembly 10, where the end cover assembly 10 includes an end cover plate 10', the end cover plate 10' is connected (for example, welded) to the housing 40 to form a shell of the battery cell 400, the electrode assembly 30 is disposed in the housing 40, and the housing 40 is filled with an electrolyte. The battery cell 400 may be cube-shaped, cuboid-shaped, or cylinder-shaped.

Based on actual use requirements, one or more electrode assemblies 30 may be provided. As shown in FIG. 1-D, at least two separately wound electrode assemblies 30 may alternatively be disposed in the battery. A body portion of the electrode assembly 30 may be formed by winding or stacking a first electrode plate, a second electrode plate, and a separator located between the adjacent first electrode plate and second electrode plate, where the separator is an insulator sandwiched between the adjacent first electrode plate and second electrode plate. The body portion has two end faces that are back away from each other. In this embodiment, the first electrode plate is a positive electrode plate, and the second electrode plate is a negative electrode plate. A coating region of the positive electrode plate is coated with a positive electrode active substance, and a coating region of the negative electrode plate is coated with a negative electrode active substance. A plurality of non-coating regions extending out of the coating regions of the body portion are stacked to form tabs. The electrode assembly includes two tabs 301: a positive tab and a negative tab. The positive tab extends out of the coating region of the positive electrode plate, and the negative tab extends out of the coating region of the negative electrode plate.

The end cover assembly 10 is disposed on the top of the electrode assembly 30. As shown in FIG. 1-D, the end cover assembly 10 includes an end cover plate 10' and two electrode terminals 5, the two electrode terminals 5 include a positive electrode terminal and a negative electrode terminal, each electrode terminal 5 is correspondingly provided with a connection member 20, and the connection member 20 is located between the end cover plate 10' and the electrode assembly 30.

For example, as shown in FIG. 1-D, the tabs 301 of the electrode assembly 30 are located on the top, the positive tab is connected to the positive electrode terminal by using one connection member 20, and the negative tab is connected to the negative electrode terminal by using the other connection member 20. In some embodiments, the battery cell 400 may include two end cover assemblies 10, disposed on two ends of the housing 40 respectively, where each end cover assembly 10 is provided with a terminal 5.

An explosion-proof member may further be disposed on the end cover plate 10', to release gas in the battery cell 400 in a timely manner when there is excessive gas in the battery cell 400, so as to avoid explosion.

A degassing hole is provided on the end cover plate 10'. The degassing hole may be provided on a middle position of the end cover 10' in a length direction. The explosion-proof member includes a pressure relief mechanism 6, where the pressure relief mechanism 6 is disposed on the degassing hole. In a normal state, the pressure relief mechanism 6 is mounted in the degassing hole in a sealed manner. When the battery swells and gas pressure in the shell rises above a preset value, the pressure relief mechanism 6 is actuated, and gas is released by using the pressure relief mechanism 6.

The pressure relief mechanism 6 is a component or part that can be actuated when internal pressure or internal temperature of the battery cell 400 reaches a preset threshold, to release the internal pressure and/or internal substance. The pressure relief mechanism 6 may specifically be in a form of an explosion-proof valve, a gas valve, a relief valve, a safety valve, or the like, or may specifically be a pressure- or temperature-sensitive component or structure. To be specific, when internal pressure or temperature of the battery cell 400 reaches a preset threshold, the pressure relief mechanism 6 performs actions or a weak structure in the pressure relief mechanism 6 is broken, so as to form an opening or channel for releasing the internal pressure. The threshold in this application may be a pressure threshold or a temperature threshold. Design of the threshold varies depending on different design demands. For example, the threshold may be designed or determined based on an internal pressure or internal temperature value of the battery cell 400 that is considered as having a danger or runaway risk. In addition, the threshold may, for example, depend on the material of one or more of a positive electrode plate, a negative electrode plate, an electrolyte, and a separator in the battery cell 400.

The term "actuate" mentioned in this application means that the pressure relief mechanism 6 performs actions or is activated to a specific state, so that internal pressure of the battery cell 400 can be released. The actions generated by the pressure relief mechanism 6 may include but are not limited to: rupturing, breaking, tearing, or opening at least part of the pressure relief mechanism 6. When the pressure relief mechanism 6 is actuated, high-temperature and high-pressure substances in the battery cell 400 are discharged as emissions out of an actuated part. In this way, the battery cell 400 can release pressure in the case of controllable pressure or temperature, thereby avoiding potential and more serious accidents. The emissions from the battery cell 400 mentioned in this application include but are not limited to: electrolyte, fragments of positive and negative electrode plates and separator because of dissolution or breaking, high-temperature and high-pressure gas and flames generated by reactions, and the like. The high-temperature and high-pressure emissions are discharged towards a direction in which the pressure relief mechanism 6 is disposed on the battery cell 400, and more specifically, may be discharged towards a direction of an actuated region of the pressure relief mechanism 6. Power and destructive impact of the emissions may be quite large, and even may be large enough to break through one or more structures such as a cover body in this direction.

In some embodiments, as shown in FIG. 1-D, a through-hole for injecting electrolyte into the battery cell 400 is provided on the end cover plate 10', and the through-hole may be a circular hole, an elliptical hole, a polygonal hole, or a hole in other shapes, and may extend in a height direction of the end cover plate 10'. An injection member 2 for sealing the through-hole is disposed on the end cover plate 10'.

Figure 3:
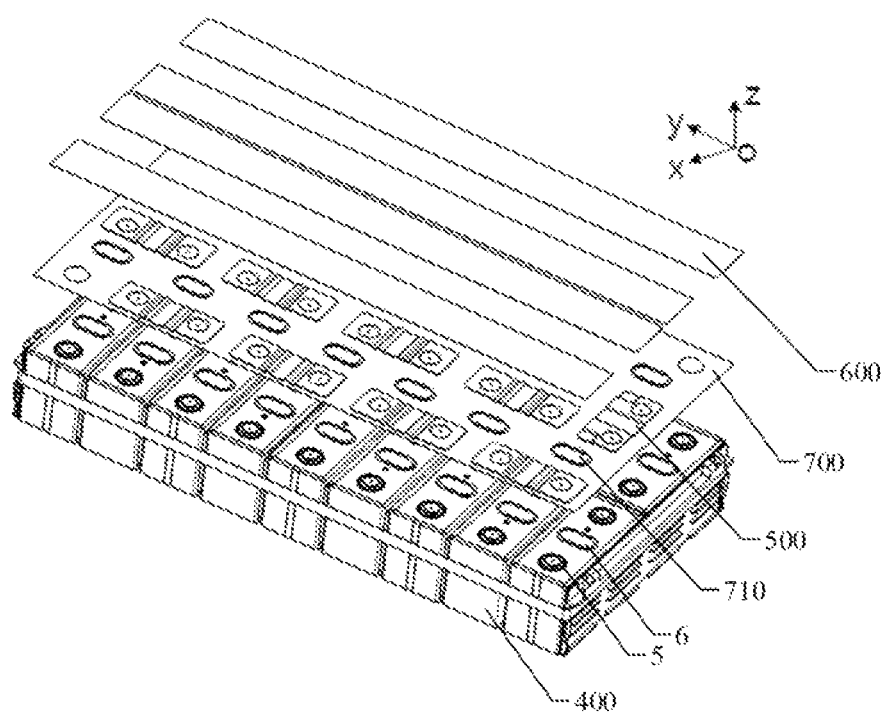
FIG. 3 is a schematic exploded view of the structure shown in FIG. 2 according to an embodiment of this application.

As shown in FIG. 2 and FIG. 3, the battery 200 provided in this embodiment of this application includes a plurality of battery cells 400, a busbar 500, and an insulation part 600, where the plurality of battery cells 400 are configured to be electrically connected by using the busbar 500; the battery cell 400 further includes a pressure relief mechanism 6, where the pressure relief mechanism 6 is configured to be actuated when internal pressure or temperature of the battery cell 400 reaches a threshold, to release the internal pressure; and the insulation part 600 is configured to cover the busbar 500 to prevent emissions from the battery cell 400 from causing short circuit of at least one battery cell 400 when the pressure relief mechanism 6 is actuated.

In some embodiments, the busbar 500 may be electrically connected to the plurality of battery cells 400 in a welding or bolt joint manner. In the embodiments of this application, the plurality of battery cells 400 are constructed to be electrically connected by using the busbar 500, and the busbar 500 is configured to transfer a current generated by the battery cells 400, so that series connection and/or parallel connection between the plurality of battery cells 400 can be implemented.

In the embodiments of this application, each battery cell 400 includes a pressure relief mechanism 6, where the pressure relief mechanism 6 is configured to be actuated when internal pressure or temperature of the battery cell 400 reaches a threshold, to release the internal pressure of the battery cell 400. The arrangement location and structural form of the pressure relief mechanism 6 have already been described in detail in the foregoing embodiments.

As described above, the pressure relief mechanism 6 is disposed on the degassing hole of the end cover plate 10'. In a normal state, the pressure relief mechanism 6 is mounted in the degassing hole in a sealed manner. When the battery cell 400 swells and pressure or temperature in the shell rises above a threshold, the pressure relief mechanism 6 is actuated, and high temperature emissions such as gas in the battery cell 400 are discharged out of the pressure relief mechanism 6, so that internal pressure of the battery cell 400 can be released, to avoid exploration and other dangerous accidents.

When one or more battery cells 400 fail and emissions are discharged out of the pressure relief mechanism 6, some emissions may splash to the busbar 500, making positive and negative electrodes of some battery cells 400 to be directly connected and causing short circuit. In the embodiments of this application, the insulation part 600 for covering the busbar 500 is disposed, to isolate and wrap the busbar 500, thereby reducing short circuit or high voltage spark of the battery 200.

As shown in FIG. 1-B, FIG. 1-C and FIG. 1-D, the battery module 300 in the battery 200 includes a plurality of battery cells 400, each battery cell 400 is provided with two electrode terminals 5, and the two electrode terminals 5 include a positive electrode terminal and a negative electrode terminal, where the positive electrode terminal is connected to the positive tab of the electrode assembly 30, and the negative electrode terminal is connected to the negative tab of the electrode assembly 30.

As shown in FIG. 3, in the battery 200, the busbar 500 functions to connect the electrode terminals 5 of the adjacent battery cells 400, to implement series connection or parallel connection of the plurality of battery cells 400.

Still referring to FIG. 3, one busbar 500 connects the electrode terminals 5 of two adjacent battery cells 400. If the connected electrode terminals 5 of the two battery cells 400 are both positive electrode terminals or negative electrode terminals, the busbar 500 implements parallel connection of the two battery cells 400. If the connected electrode terminals 5 of the two battery cells 400 include a positive electrode terminal and a negative electrode terminal, the busbar 500 implements series connection of the two battery cells 400.

In some embodiments, the two electrode terminals 5 may be located on a same side of the battery cell 400, or may be located on two sides of the battery cell 400. Therefore, the busbar 500 may be located on a same side of the battery cell 400, or may be located on two sides of the battery cell 400.

In this application, because the electrode terminals 5 are disposed on a side of the battery cell 400 having the pressure relief mechanism 6, the insulation part 600 provided in the embodiments of this application is mainly configured to cover the busbar 500 located on the side having the pressure relief mechanism 6, to prevent the emissions discharged out of the pressure relief mechanism 6 from directly splashing to the busbar 500 near the pressure relief mechanism 6.

Certainly, in some embodiments, the electrode terminals 5 may be disposed on a side not having the pressure relief mechanism 6. In this case, to further reduce a probability of short circuit or high voltage spark of the battery cell 400, the insulation part 600 may also cover the busbar 500 on the side not having the pressure relief mechanism 6, to prevent the emissions from flowing onto the busbar 500 along the battery cell 400, thereby fully covering the busbar 500.

The battery module 300 generally includes a plurality of battery cells 400. Therefore, the busbar 500 for connecting the plurality of battery cells 400 is also provided in plurality. As shown in FIG. 3, one electrode terminal 5 of one battery cell 400 is connected to one electrode terminal 5 of the adjacent battery cell 400 by using one busbar 500. In other words, a plurality of busbars 500 are disposed in one battery 200.

In the embodiments of this application, the insulation part 600 is also provided in plurality, and each insulation part 600 covers at least one busbar 500.

In some embodiments, in the embodiments of this application, as shown in FIG. 3, the insulation part 600 may be in a long strip shape, and one insulation part 600 covers a plurality of busbars 500 that are on a plurality of battery cells 400 and that are arranged in a same column in the y direction. Likewise, the insulation part 600 may alternatively be set into a shape that can cover multiple columns of busbars 500. That is, a length of the insulation part 600 may be the same as a total length of a plurality of battery cells 400 in a same column, and a width of the insulation part 600 may be a width of one busbar 500, or may be a width of one battery cell 400, as long as the busbar 500 can be covered to prevent the emissions discharged out of the pressure relief mechanism 6 from causing short circuit of the battery cell. The length and width of the insulation part 600 are not specifically limited in the embodiments of this application.

Figure 4:
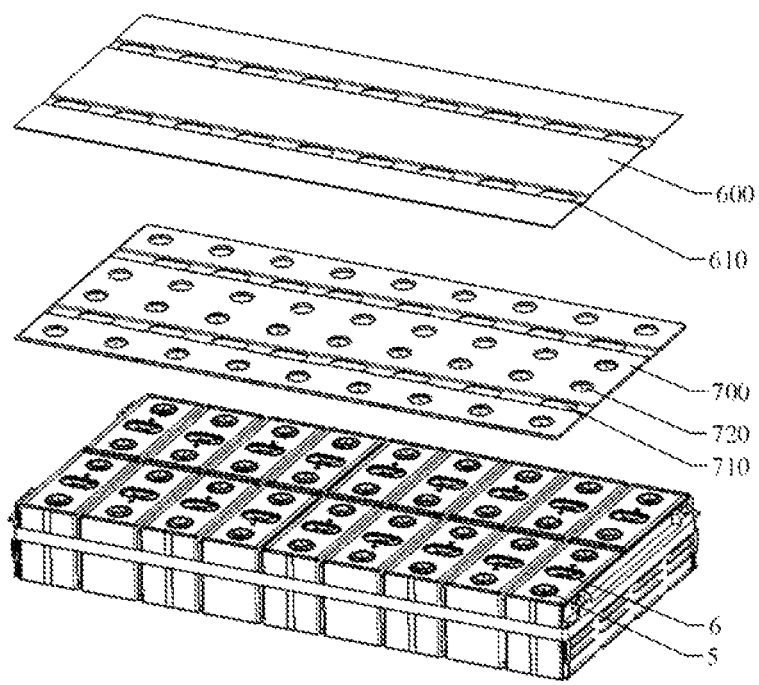
FIG. 4 is a schematic exploded view of another structure inside a battery housing according to an embodiment of this application.
Figure 5:
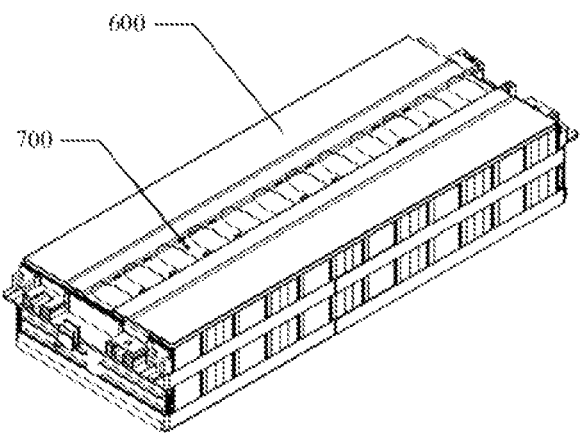
FIG. 5 is a schematic structural diagram of a still another structure inside a battery housing according to an embodiment of this application.

In some embodiments, in the embodiments of this application, as shown in FIG. 4, the insulation part 600 may be set into an integral structure, to cover all the busbars 500 of the plurality of battery cells 400. The plurality of battery cells 400 may be in one battery module 300, or may be in a plurality of battery modules 300. This is not particularly limited in the embodiments of this application.

In some embodiments, to prevent the insulation part 600 from blocking the pressure relief mechanism 6 and causing the pressure relief mechanism unable to be actuated, the insulation part 600 needs to avoid the pressure relief mechanism 6 of the battery cell 400, so that the pressure relief mechanism 6 can be actuated properly. For example, when the insulation part 600 is long strip-shaped, a distance between the adjacent insulation parts should be large enough to avoid the pressure relief mechanism 6 of the battery cell 400.

However, if the insulation part 600 is so wide that the pressure relief mechanism 6 is covered, or the insulation part 600 is set into an integral structure, a first avoidance hole 610 needs to be provided on the insulation part 600 to avoid covering the pressure relief mechanism 6, so that the emissions discharged out of the pressure relief mechanism 6 can be discharged out of the first avoidance hole 610.

In some embodiments, a quantity of first avoidance hole 610 needs to be the same as a quantity of pressure relief mechanisms 6, a location of the first avoidance hole 610 corresponds to a location of the pressure relief mechanism 6, and a shape of the first avoidance hole 610 may be the same as a shape of the pressure relief mechanism 6 or slightly larger than a shape of the pressure relief mechanism 6, to ensure that the emissions discharged out of the pressure relief mechanism 6 are not blocked.

In some embodiments, the plurality of battery cells 400 are stacked to form a battery module 300; and the insulation part 600 is configured to cover the busbar 500 located on the adjacent battery modules 300. As shown in FIG. 3, the busbar 500 for connecting the two electrode terminals 5 of the adjacent battery modules 300 is arranged in a direction perpendicular to other busbars 500, and the busbar 500 may be covered by two insulation parts 600. The busbar 500 may alternatively be covered by one wider insulation part 600. This is not particularly limited in the embodiments of this application.

In some embodiments, the battery 200 may further include an isolation part 700, where the isolation part 700 is configured to mount the busbar 500. As shown in FIG. 3, the isolation part 700 is disposed on the battery cell 400, the busbar 500 is disposed on a side of the isolation part 700 back away from the battery cell 400, and the isolation part 700 further has an avoidance region 720. As shown in FIG. 4, the avoidance region 720 is configured to expose at least part of the busbar 500, meaning that the avoidance region 720 is a through-hole, so that the busbar 500 is electrically connected to the battery cell 400, and specifically, the busbar 500 is connected to the electrode terminal 5 of the battery cell 400.

In an embodiment of this application, the avoidance region 720 is a through-hole matching the electrode terminal 5 in shape. The electrode terminal 5 may be connected to the busbar 500 through the through-hole, helping save space in the battery 200, allowing the isolation part 700 to be more closely connected to the battery cell 400, and making the entire battery 200 more compact in structure.

In an embodiment of this application, to prevent the isolation part 700 from blocking the pressure relief mechanism 6, a second avoidance hole 710 is provided on the isolation part 700 to avoid covering the pressure relief mechanism 6, so that the emissions discharged out of the pressure relief mechanism 6 can be discharged out of the second avoidance hole 710 and the first avoidance hole 610.

In some embodiments, a location of the second avoidance hole 710 corresponds to a location of the first avoidance hole 610 and a location of the pressure relief mechanism 6, a quantity of second avoidance holes 710 is the same as a quantity of pressure relief mechanism 6, and a shape of the first avoidance hole 610 may be the same as a shape of the pressure relief mechanism 6 or slightly larger than a shape of the pressure relief mechanism 6, to ensure that the emissions discharged out of the pressure relief mechanism 6 are not blocked. In addition, the shape of the second avoidance hole 710 may be the same as the shape of the first avoidance hole 610, to facilitate machining, mounting and fastening.

In the embodiments of this application, the isolation part 700 may be a harness isolation plate assembly. The harness isolation plate assembly and the busbar 500 may form an integrated structure by using a hot-pressing process, and the isolation part 700 may be an integrated structure that has a similar size as the battery module 300, so that the battery cells 400 in the battery module 300 are all electrically connected.

In an embodiment of this application, as shown in FIG. 3 and FIG. 4, the busbar 500 is mounted on the isolation part 700. In this way, the avoidance region 720 can be provided for the busbar 500 to connect to the electrode terminal 5. In addition, the busbar 500 can be prevented from coming into contact with other parts on the battery cell 400, thereby avoiding interference in a current transfer process.

Further, in an embodiment of this application, to prevent the emissions discharged out of the pressure relief mechanism 6 from flowing to the battery cell 400 through the avoidance region 720 and causing short circuit of at least one battery cell 400, the insulation part 600 also needs to block the avoidance region 720, that is, blocking the avoidance region 720 while blocking the busbar 500.

In some embodiments, to block the busbar 500 and the avoidance region 720 means to cover the busbar 500 and the avoidance region 720. In addition, the insulation part 600 needs to avoid the second avoidance hole 710 while covering the busbar 500 and the avoidance region 720, so that the emissions discharged out of the pressure relief mechanism 6 can be ejected out smoothly.

In some embodiments, in some embodiments, to cover the busbar 500, the insulation part 600 may be directly connected to the isolation part 700 outside the avoidance region 720, and the connection manner may be one or more of bonding, welding, film coating, coating, or spray-coating.

In some embodiments, in an embodiment of this application, the insulation part 600 may be at least one of the following: epoxy resin film, mica paper, electrophoresis film, asbestos layer, ceramic layer, silicon oxide film, silicon nitride film, aluminum oxide film, aluminum nitride film, polyimide film, polyethylene film, polyvinylidene fluoride film, and polytetrafluoroethylene film.

In some embodiments, a thickness of the insulation part 600 may be set based on actual situations. For example, a thickness of the insulation part 600 may be 0.5 mm to 3 mm. Under the condition of sufficient corrosion resistance is satisfied, that is, not broken by corrosion caused by the high-temperature and high-pressure emissions, the insulation part 600 needs to be as thin as possible, so as to save space in the battery 200 and improve energy density of the battery. The specific thickness of the insulation part 600 is not particularly limited in the embodiments of this application.

In some embodiments, the high-temperature and high-pressure emissions discharged out of the battery cell 400 are mostly discharged towards a direction of the pressure relief mechanism 6, and specifically, discharged towards a direction of a region for causing the pressure relief mechanism 6 to be actuated. Power and destructive impact of the emissions may be quite large, and even may be large enough to break through one or more structures in this direction, causing a safety issue. In addition, after thermal runaway occurs in the battery cell 400, the battery cell 400 may continuously generate high voltage and high heat inside, causing persistent safety risks.

Figure 6:
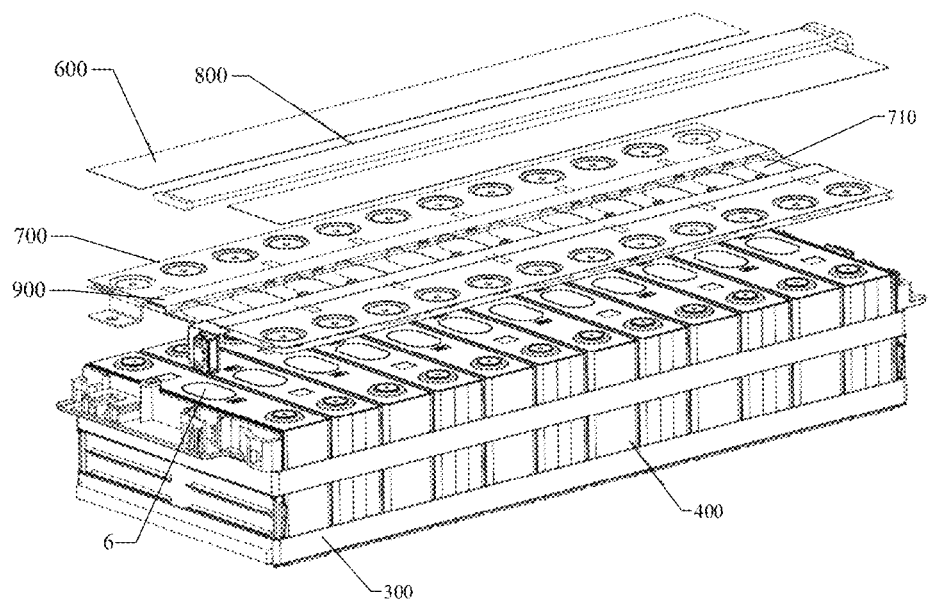
FIG. 6 is a schematic exploded view of the structure shown in FIG. 5 according to an embodiment of this application.

To resolve the foregoing problems, in an embodiment of this application, as shown in FIG. 6, a fire protection system may be disposed in a box body of the battery 200, and a fire protection pipeline 800 of the fire protection system is disposed above a side of the battery cell 400 having the pressure relief mechanism. The fire protection pipeline 800 is configured to accommodate a fire protection medium. The fire protection pipeline 800 is configured to discharge the fire protection medium to the battery cell 400 when the pressure relief mechanism 6 is actuated, so that the emissions discharged out of the pressure relief mechanism 6 can be cooled, reducing the risk of the emissions. The fire protection medium may also flow into the battery cell 400 through the actuated pressure relief mechanism 6, so as to further cool the battery cell 400 and enhance safety of the battery 200. In addition, the fire protection pipeline 800 may also be broken by the emissions that are discharged out of the battery cell 400 when the pressure relief mechanism 6 is actuated, to allow the fire protection medium in the fire protection pipeline 800 to be discharged.

In an embodiment of this application, the insulation part 600 is further configured to prevent the fire protection medium flowing out of the fire protection pipeline 800 from causing short circuit of at least one battery cell 400 when the pressure relief mechanism 6 is actuated. In other words, the insulation part 600 provided in the embodiments of this application can not only prevent the emissions discharged out of the pressure relief mechanism 6 from causing short circuit of the battery cell 400, but also prevent the fire protection medium discharged out of the fire protection pipeline 800 from causing short circuit of the battery cell 400.

In some embodiments, to allow the fire protection medium discharged out of the fire protection pipeline 800 to directly enter the battery cell 400 through the pressure relief mechanism 6, the fire protection pipeline 800 is disposed on a position relative to the pressure relief mechanism 6. In the embodiments of this application, because the isolation part 700 is disposed on the pressure relief mechanism 6, the emissions discharged out of the pressure relief mechanism 6 can be discharged through the second avoidance hole 710 of the isolation part 700. Therefore, the fire protection pipeline 800 is disposed on a position relative to the second avoidance hole 710 over the isolation part 700, so that the fire protection pipeline 800 is disposed relative to the pressure relief mechanism 6.

In an embodiment of this application, the fire protection pipeline 800 includes a first region corresponding to the pressure relief mechanism 6 and a second region located on a periphery of the first region, where the first region is configured to be broken when the pressure relief mechanism 6 is actuated, to discharge the fire protection medium, and the second region is configured to remain intact when the pressure relief mechanism 6 is actuated, to allow the fire protection medium to flow from the second region to the first region.

In the embodiments of this application, the fire protection pipeline 800 is configured to allow the emissions from the battery cell 400 to break the first region when the pressure relief mechanism 6 is actuated, so that the fire protection medium is discharged out of the first region and enters the battery cell 400 through the pressure relief mechanism 6. To be specific, when the battery fails and gas pressure in the battery rises above a preset value, high-temperature and high-pressure substances in the battery cell 400 are discharged as emissions out of an actuated part of the pressure relief mechanism 6, and the high-temperature and high-pressure emissions may perforate the first region of the fire protection pipeline 800, so that the fire protection medium flows out of the fire protection pipeline 800 and flows into the battery cell 400 through the pressure relief mechanism 6, to implement fire protection in the battery cell 400.

In the embodiments of this application, the high-temperature and high-pressure emissions ejected out of the battery cell 400 are used to perforate the first region of the fire protection pipeline 800, so that precision fire protection can be implemented for the failed battery cell 400. Only the first region of the fire protection pipeline 800 relative to the failed battery cell 400 is perforated, and the second region remains intact, so that the fire protection medium can flow only out of the first region, to achieve a better fire protection effect.

In some embodiments, the fire protection medium discharged out of the fire protection pipeline 800 can enter the battery cell 400 through the pressure relief mechanism 6, so that the foregoing precision fire protection in the embodiments of this application can increase utilization of the fire protection medium, to achieve a better fire protection effect.

In an embodiment of this application, to allow the first region of the fire protection pipeline 800 to be perforated, the first region may be a first weak region. The first weak region is configured to be broken by the emissions when the pressure relief mechanism 6 is actuated, to allow the fire protection medium to be discharged out of the first weak region, to implement fire protection.

In the embodiments of this application, the first weak region is provided on the fire protection pipeline 800, to allow the high-temperature and high-pressure emissions ejected out of the battery cell 400 to more rapidly perforate the fire protection pipeline 800, thereby improving efficiency of fire protection.

In the embodiments of this application, the first weak region may be weak in structure. For example, a thickness of the first weak region is smaller than a thickness of other portions of the fire protection pipeline 800. Alternatively, the first weak region may be weak in material. For example, a material of the first weak region may be a material that is easily broken by the high-temperature and high-pressure emissions ejected out of the battery cell 400, or a toughness of the first weak region may be less than a toughness of other portions of the fire protection pipeline 800. This is not particularly limited in the embodiments of this application.

In some embodiments, the fire protection medium may be fluid, and the fluid may be liquid or gas. When the pressure relief mechanism 6 does not break the fire protection pipeline 800, the fire protection pipeline 800 may accommodate no substances. When the pressure relief mechanism 6 is actuated, the fire protection pipeline 800 accommodates the fire protection medium, for example, a valve may be switched on or off to control the fire protection medium to enter the fire protection pipeline 800. Alternatively, when the pressure relief mechanism 6 is not broken, the fire protection pipeline 800 may always accommodate the fire protection medium, and the fire protection medium may also be used to adjust temperature of the battery cell 400. To adjust temperature means to heat or cool the plurality of battery cells 400. In a case of cooling or lowering temperature of the battery cells 400, the fire protection pipeline 800 is configured to accommodate cooling fluid to lower temperature of the plurality of battery cells 400. In this case, the fire protection pipeline 800 may also be referred to as a cooling part, a cooling system, a cooling pipeline, or the like, and the fire protection medium accommodated therein may also be referred to as a cooling medium or cooling fluid, and more specifically, cooling liquid or cooling gas. In some embodiments, the fire protection medium may circulate, to implement a better temperature adjustment effect. In some embodiments, the fire protection medium may be water, mixed liquid of water and glycol, air, or the like.

In an embodiment of this application, the fire protection pipeline 800 may be a long strip-shaped pipeline, and a cross sectional shape of the fire protection pipeline 800 may be a square, circular, semicircular, or other shapes. This is not particularly limited in the embodiments of this application. A size of the fire protection pipeline 800 may be determined based on an actual size of the battery. This is not particularly limited in the embodiments of this application.

In some embodiments, generally a plurality of battery cells 400 need to be disposed in the battery 200, and the plurality of battery cells 400 may be connected in series, in parallel, or in a hybrid connection mode to form a battery module 300.

In an embodiment of this application, the plurality of battery cells 400 are set into at least one battery module 300, each battery module 300 includes at least one battery cell 400, and pressure relief mechanisms 6 of the battery cells 400 in each battery module 300 are all disposed relative to one fire protection pipeline 800.

One battery module 300 corresponds to one fire protection pipeline 800, and the pressure relief mechanisms of the battery cells 400 in the battery module 300 are all disposed relative to the fire protection pipeline 800, so that the fire protection pipeline 800 can implement fire protection on the plurality of battery cells 400 in the battery module 300, thereby reducing the number of fire protection pipelines 800 and saving costs.

Figure 7:
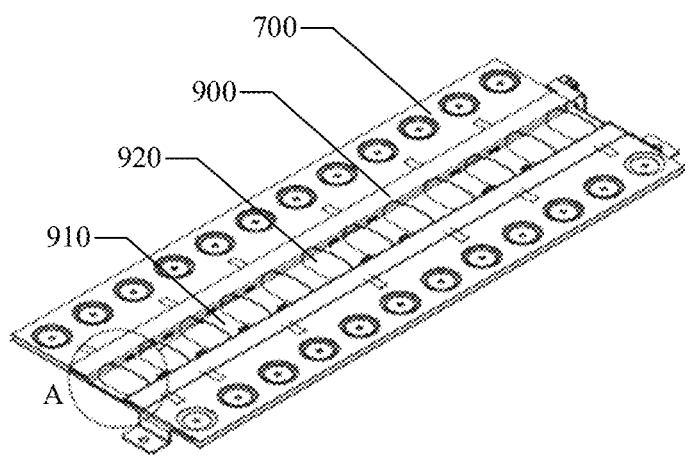
FIG. 7 is a schematic structural diagram of an isolation part and a protection part shown in FIG. 6 according to an embodiment of this application.

As shown in FIG. 7, the battery 200 provided in an embodiment of this application further includes a protection part 900. The protection part 900 is disposed between the fire protection pipeline 800 and the battery cell 400 to protect the second region and prevent the second region from being broken by the emissions discharged out of the pressure relief mechanism 6, so as to prevent the fire protection medium in the fire protection pipeline 800 from flowing to the outside of the battery cell 400 through the second region to affect the fire protection effect.

In an embodiment of this application, the protection part 900 includes a third region 910 and a fourth region 920, where the third region 910 is configured to protect the second region of the fire protection pipeline 800 when the pressure relief mechanism 6 is actuated, and the fourth region 920 is configured to allow the emissions from the battery cell 400 to pass through the fourth region 920 to break the first region when the pressure relief mechanism 6 is actuated.

In some embodiments, the third region 910 is a protection region, and the fourth region 920 is a second weak region. The second weak region allows the high-temperature and high-pressure emissions ejected out of the battery cell 400 to more rapidly perforate the protection part 900 and then perforate the fire protection pipeline 800, to improve timeliness of fire protection. With arrangement of both the protection region and the weak region, the fire protection medium in the fire protection pipeline 800 can be discharged towards the pressure relief mechanism 6 of the battery cell 400, helping efficiently resolve safety problems caused by thermal runaway of the battery cell, rapidly lowering temperature, and improving safety performance of the battery during use.

In the embodiments of this application, the second weak region may be weak in structure. For example, a thickness of the second weak region is smaller than a thickness of the third region 910. Alternatively, the second weak region may be weak in material. For example, a material of the second weak region may be a material that is easily broken by the high-temperature and high-pressure emissions ejected out of the battery cell 400, or a toughness of the second weak region may be less than a toughness of the third region 910. Alternatively, the second weak region is a through-hole that runs through the protection part 900. This is not particularly limited in the embodiments of this application.

Figure 8:
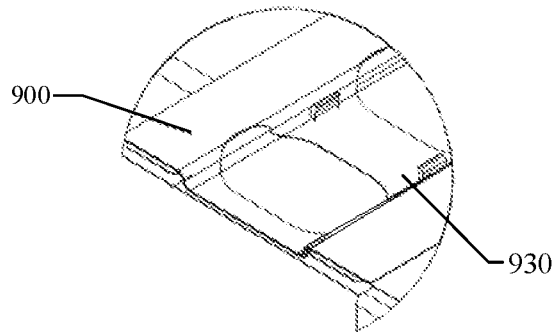
FIG. 8 is a partially enlarged view of a position A in FIG. 7 according to an embodiment of this application.

In an embodiment of this application, as shown in FIG. 8, the protection part 900 is configured to form a first groove 930 for accommodating the fire protection pipeline 800, where the first groove 930 is configured to collect, when the pressure relief mechanism 6 is actuated, the fire protection medium flowing into the battery cell 400. The fourth region is disposed on a region that is of a bottom wall of the first groove 930 and that corresponds to the first region.

It should be noted that, in some embodiments, the fire protection medium is usually ejected out of the fire protection pipeline 800 at the same time as the emissions are discharged out of the pressure relief mechanism 6, so that the fire protection medium ejected out of the fire protection pipeline 800 is quite likely to splash and flow outside the pressure relief mechanism 6, causing waste. In the embodiments of this application, with arrangement of the first groove 930, the first groove 930 is used to collect the fire protection medium ejected out of the fire protection pipeline 800, so that the fire protection medium that does not flow into the battery cell 400 through the pressure relief mechanism 6 can be temporarily stored in the first groove 930, and flow into the pressure relief mechanism 6 from the first groove 930 if conditions permit. For example, the foregoing conditions include that no emissions are discharged out of the pressure relief mechanism 6, that a discharge velocity is reduced, or the like. This is not particularly limited in the embodiments of this application.

In the battery 200 provided in the embodiments of this application, with the first groove 930 provided on the protection part 900, more fire protection medium discharged out of the fire protection pipeline 800 can enter the battery cell 400 through the pressure relief mechanism 6, so that utilization of the fire protection medium is increased, to implement a better fire protection effect.

In some embodiments, the protection part 900 is mounted on the isolation part 700. In addition, the protection part 900 may be fastened to the isolation part 700 in different manners. For example, the protection part 900 may be clamped onto the isolation part 700 by using buckles, or may be fastened to the isolation part 700 through bonding or welding, or may be integrally molded with the isolation part 700. This is not particularly limited in the embodiments of this application.

When the protection part 900 is disposed on the isolation part 700, a second groove may be provided on the isolation part 700, and the protection part 900 is mounted in the second groove. The location and size of the second groove may be set based on the protection part 900. This is not particularly limited in the embodiments of this application.

The following describes an arrangement direction of the fire protection pipeline 800 and the protection part 900 based on an arrangement direction of a plurality of battery cells 400 in a battery module 300.

As shown in FIG. 6, the fire protection pipeline 800 is disposed on the protection part 900, and the fire protection pipeline 800 is located between two adjacent insulation parts 600. In an embodiment of this application, one battery module 300 includes a plurality of battery cells 400 arranged in a preset direction, where a length direction of the fire protection pipeline 800 is the same as an arrangement direction of the plurality of battery cells 400. In this way, pressure relief mechanisms 6 of all the battery cells 400 are disposed relative to the fire protection pipeline 800, that is, one fire protection pipeline 800 provides fire protection services to the plurality of battery cells 400 in one battery module 300.

In the foregoing embodiment, the length direction of the fire protection pipeline 800 is the same as the arrangement direction of the plurality of battery cells 400, and a length direction of the protection part 900 is also the same as the arrangement direction of the plurality of battery cells 400. In addition, there are a plurality of first regions on the fire protection pipeline 800, there are a plurality of fourth regions 920 on the protection part 900, and a quantity of the first region and a quantity of the fourth region 920 are the same as a quantity of the pressure relief mechanisms 6.

In another aspect, this application further provides an electric apparatus, where the electric apparatus is configured to receive power supplied by the foregoing battery. A specific structural form and operating principle of the battery 200 have already been described in detail in the foregoing embodiments. Details are not described in this embodiment again.

In conclusion, in the electric apparatus in this embodiment of this application, with arrangement of the foregoing battery, the insulation part on the battery, and the insulation part configured to cover the busbar, emissions discharged out of one or more failed battery cells can be partly prevented from splashing to conductive objects such as the busbar, so that a probability of short circuit or high voltage spark of the battery cell can be reduced.

Figure 9:
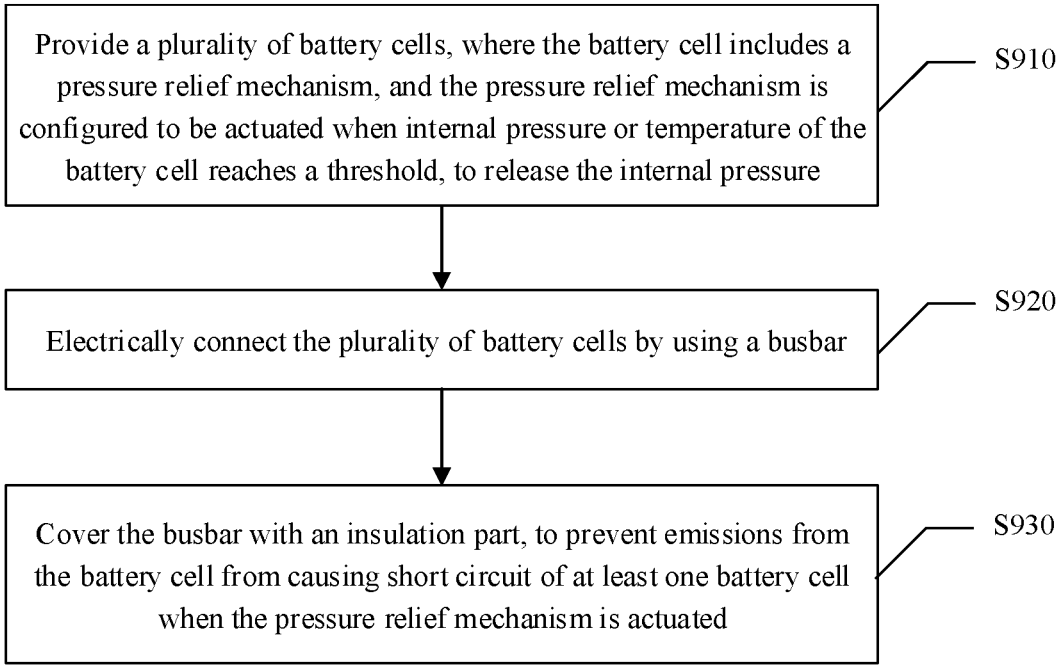
FIG. 9 is a flowchart of a method for manufacturing a battery according to an embodiment of this application.

In another aspect, this application further provides a method for manufacturing a battery. FIG. 9 illustrates a method for manufacturing a battery according to this application. The method for manufacturing a battery may include the following steps.

Step S910: provide a plurality of battery cells, where the battery cell includes a pressure relief mechanism, and the pressure relief mechanism is configured to be actuated when internal pressure or temperature of the battery cell reaches a threshold, to release the internal pressure.

Step S920: electrically connect the plurality of battery cells by using a busbar.

Step S930: cover the busbar with an insulation part, to prevent emissions from the battery cell from causing short circuit of at least one battery cell when the pressure relief mechanism is actuated.

It may be learned from the battery embodiments that, the pressure relief mechanism 6 needs to be prepared on the battery cell 400, and the busbar 500 is prepared to electrically connect electrode terminals 5 of the plurality of battery cells 400.

In this embodiment of this application, an insulation part 600 also needs to be prepared, and the insulation part 600 covers the busbar 500. Specifically, the insulation part 600 may cover the busbar 500 in one or more manners of bonding, welding, film coating, coating, or spray-coating.

It may be learned from the embodiments of the battery 200 that, the battery 200 further includes other parts. These parts may be manufactured by using corresponding methods, to finally obtain the required battery 200. In some embodiments, any methods for manufacturing related parts and connecting related parts shall all fall within the protection scope of the embodiments of this application. Details are not described in the embodiments of this application.

Figure 10:
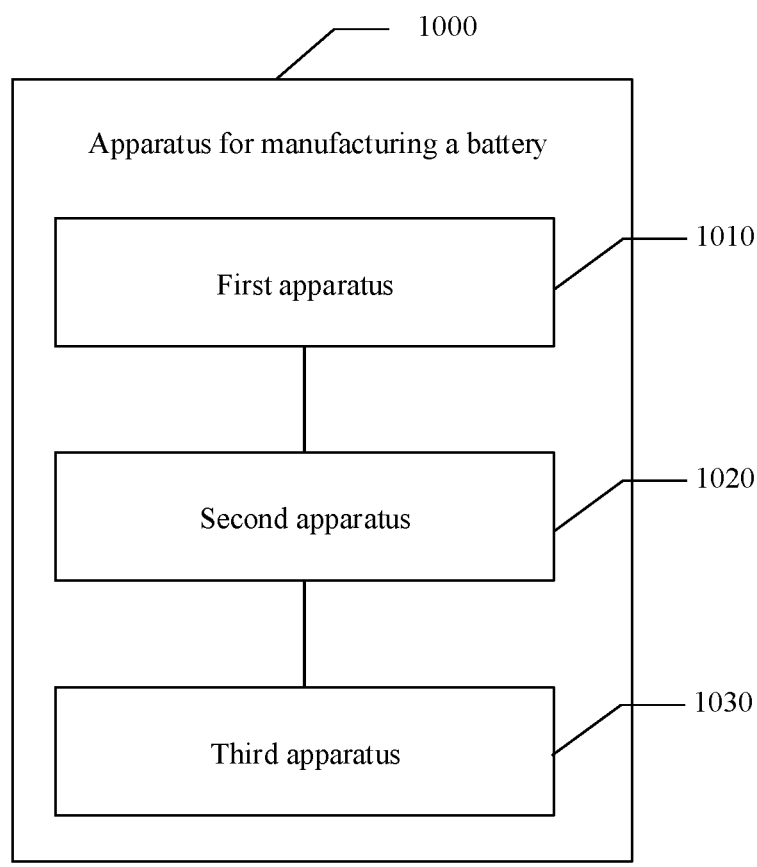
FIG. 10 is a block diagram of an apparatus for manufacturing a battery according to an embodiment of this application.

In another aspect, this application further provides an apparatus for manufacturing a battery. FIG. 10 is a block diagram of an apparatus for manufacturing a battery according to an embodiment of this application. As shown in FIG. 10, the apparatus 1000 for manufacturing a battery may include: a first apparatus 1010, a second apparatus 1020, and a third apparatus 1030.

The first apparatus 1010 is configured to provide a plurality of battery cells, where the battery cell includes a pressure relief mechanism, and the pressure relief mechanism is configured to be actuated when internal pressure or temperature of the battery cell reaches a threshold, to release the internal pressure.

The second apparatus 1020 is configured to electrically connect the plurality of battery cells by using a busbar.

The third apparatus 1030 is configured to cover the busbar with an insulation part, to prevent emissions from the battery cell from causing short circuit of at least one battery cell when the pressure relief mechanism is actuated.

All specific details of the apparatus for manufacturing a battery have already been described in detail in the corresponding embodiments of the battery. Details are not described herein again.

Reference may be made between the foregoing protection subjects in this application and the features in the embodiments. If structures permit, a person skilled in the art may flexibly combine the technical features in different embodiments to form more embodiments.

The foregoing describes the battery and the electric apparatus provided in this application in detail. The principle and implementations of this application are described herein through specific embodiments. The foregoing embodiments are merely described to help understand the method of this application and its core concept. It should be noted that a person of ordinary skill in the art can make several improvements and modifications to this application without departing from the principle of this application, and such improvements and modifications also fall within the protection scope of the claims of this application.

What is claimed is:
1. A battery, comprising:
 a plurality of battery cells electrically connected by a busbar, one battery cell of the plurality of battery cells comprising an electrode terminal and a pressure relief mechanism, and the pressure relief mechanism being configured to be actuated when internal pressure or temperature of the one battery cell reaches a threshold, to release the internal pressure;
 an insulation part, configured to cover the busbar to prevent emissions from the one battery cell from causing a short circuit of at least one battery cell of the plurality of battery cells when the pressure relief mechanism is actuated; and
 an isolation part configured to mount the busbar, and comprising an avoidance region corresponding to the electrode terminal and an avoidance hole corresponding to the pressure relief mechanism, the avoidance region being configured to expose at least part of the busbar, and the avoidance hole and the avoidance region being spaced apart from each other on the isolation part.

2. The battery according to claim 1, wherein the insulation part is one of a plurality of the insulation parts of the battery, the busbar is one of a plurality of busbars of the battery, and each of the plurality of insulation parts covers at least one of the plurality of busbars.

3. The battery according to claim 2, wherein at least one of the plurality of insulation parts is configured to cover two or more of the plurality of busbars located on a side having the pressure relief mechanism.

4. The battery according to claim 1, wherein:
two or more of the plurality of battery cells are stacked to form a battery module of a plurality of battery modules; and
the insulation part is configured to cover the busbar located on adjacent battery modules of the plurality of battery modules.

5. The battery according to claim 1, wherein a thickness of the insulation part is 0.5 mm to 3 mm.

6. The battery according to claim 1, wherein the battery includes a plurality of the insulation parts and the busbars, each insulation part covers at least one busbar, and a thickness of an insulation part is 0.5 mm to 3 mm.

7. The battery according to claim 1, further comprising a fire protection pipeline, configured to accommodate a fire protection medium, wherein the fire protection pipeline is configured to discharge the fire protection medium to the one battery cell when the pressure relief mechanism is actuated, and the insulation part is configured to prevent the fire protection medium from causing the short circuit of the at least one battery cell of the plurality of battery cells when the pressure relief mechanism is actuated.

8. The battery according to claim 2, further comprising a fire protection pipeline, configured to accommodate a fire protection medium, wherein the fire protection pipeline is configured to discharge the fire protection medium to the one battery cell when the pressure relief mechanism is actuated, and the insulation part is configured to prevent the fire protection medium from causing the short circuit of the at least one battery cell of the plurality of battery cells when the pressure relief mechanism is actuated.

9. The battery according to claim 7, wherein the fire protection pipeline comprises a first region corresponding to the pressure relief mechanism and a second region located on a periphery of the first region; the first region is configured to be broken when the pressure relief mechanism is actuated, to discharge the fire protection medium; and the second region is configured to remain intact when the pressure relief mechanism is actuated, to allow the fire protection medium to flow from the second region to the first region.

10. The battery according to claim 9, further comprising a protection part, disposed between the fire protection pipeline and the one battery cell to protect the second region.

11. The battery according to claim 10, wherein the protection part comprises a third region and a fourth region, the third region is configured to protect the second region of the fire protection pipeline when the pressure relief mechanism is actuated, and the fourth region is configured to allow the emissions from the one battery cell to pass through the fourth region to break the first region when the pressure relief mechanism is actuated.

12. The battery according to claim 11, wherein the protection part is configured to form a first groove for accommodating the fire protection pipeline, the first groove is configured to collect, when the pressure relief mechanism is actuated, the fire protection medium flowing into the one battery cell.

13. The battery according to claim 12, wherein the fourth region is arranged on a region that is of a bottom wall of the first groove and that corresponding to the first region.

14. The battery according to claim 1, wherein a second groove is provided on the isolation part, and the protection part is disposed in the second groove.

15. An electric apparatus, wherein the electric apparatus is configured to receive power supplied by the battery according to claim 1.

16. A method for manufacturing a battery, comprising:
providing a plurality of battery cells, wherein one battery cell of the plurality of battery cells comprises a pressure relief mechanism and an electrode terminal, and the pressure relief mechanism is configured to be actuated when internal pressure or temperature of the one battery cell reaches a threshold, to release the internal pressure;
electrically connecting the plurality of battery cells by using a busbar; and
covering the busbar with an insulation part, to prevent emissions from the one battery cell from causing a short circuit of at least one battery cell of the plurality of battery cells when the pressure relief mechanism is actuated;
wherein the battery further comprises an isolation part, the isolation part is configured to mount the busbar, and the isolation part comprises an avoidance region corresponding to the electrode terminal and an avoidance hole corresponding to the pressure relief mechanism, the avoidance region is configured to expose at least part of the busbar, and the avoidance hole and the avoidance region are spaced apart from each other on the isolation part.

17. An apparatus for manufacturing a battery, comprising:
a first apparatus, configured to provide a plurality of battery cells, wherein one battery cell of the plurality of battery cells comprises a pressure relief mechanism and an electrode terminal, and the pressure relief mechanism is configured to be actuated when internal pressure or temperature of the one battery cell reaches a threshold, to release the internal pressure;
a second apparatus, configured to electrically connect the plurality of battery cells by using a busbar; and
a third apparatus, configured to cover the busbar with an insulation part, to prevent emissions from the one battery cell from causing a short circuit of at least one battery cell of the plurality of battery cells when the pressure relief mechanism is actuated;
wherein the battery further comprises an isolation part, the isolation part is configured to mount the busbar, and the isolation part comprises an avoidance region corresponding to the electrode terminal and an avoidance hole corresponding to the pressure relief mechanism, the avoidance region is configured to expose at least part of the busbar, and the avoidance hole and the avoidance region are spaced apart from each other on the isolation part.

18. The battery according to claim 1, further comprising:
a fire protection pipeline configured to accommodate a fire protection medium, and comprising a first region corresponding to the pressure relief mechanism and a second region located on a periphery of the first region, wherein the first region is configured to be broken when the pressure relief mechanism is actuated, to discharge the fire protection medium; and
a protection part disposed between the fire protection pipeline and the one battery cell, and comprising a third region corresponding to the second region of the fire protection pipeline and a fourth region corresponding to the first region of the fire protection pipeline;
wherein:
a thickness of the third region is greater than zero, and a thickness of the fourth region is greater than zero; and the thickness of the third region is greater than the thickness of the fourth region, or a roughness of the third region is greater than a roughness of the fourth region.

\* \* \* \* \*